US006382837B1

(12) United States Patent

Olbrich et al.

(10) Patent No.: US 6,382,837 B1

(45) Date of Patent: May 7, 2002

(54) DEVICE AND METHOD FOR HOLDING A DRUM IN A PRINTER OR COPIER

(75) Inventors: Otto Olbrich, Taufkirchen; Peter Thiemannn, Munich, both of (DE)

(73) Assignee: Oce Printing Systems GmbH (DE)

( * ) Notice: Subject to any disclaimer, the term of this patent is extended or adjusted under 35 U.S.C. 154(b) by 0 days.

(21) Appl. No.: 09/572,815

(22) Filed: May 17, 2000

(51) Int. Cl.[7] .......................... F16C 13/00; G03G 15/00

(52) U.S. Cl. ....................... 384/278; 384/905; 384/419; 399/117; 492/21

(58) Field of Search ................................. 384/278, 416, 384/418, 419, 905; 492/21, 42, 46; 399/117, 167

(56) References Cited

U.S. PATENT DOCUMENTS 3,261,648 A * 7/1966 Rigg et al. .................. 384/278
4,226,485 A * 10/1980 Pruvot ........................ 384/905
5,450,167 A 9/1995 Okano et al. ................. 399/88
5,583,624 A * 12/1996 Heigl ........................ 492/21 X
5,655,182 A 8/1997 Sanchez et al. ............. 399/117
5,878,310 A * 3/1999 Noda et al. .................. 399/117
6,072,968 A * 6/2000 Nomura et al. ......... 399/117 X

FOREIGN PATENT DOCUMENTS

DE 43 15 274 C1 6/1994
EP 0 345 270 B1 12/1989

OTHER PUBLICATIONS

Japanese Abstract, 62–67580, Mar. 27, 1987.
Japanese Abstract, 1–254971, Oct. 11, 1989.
Japanese Abstract, 5–289588, Nov. 5, 1993.
Japanese Abstract, 58–116569, Jul. 11, 1983.
Japanese Abstract, 09190033, Jul. 22, 1997.
Japanese Abstract, 3–181983, Aug. 7, 1991.

* cited by examiner

*Primary Examiner*—Thomas R. Hannon

(57) ABSTRACT

A device and a method for the holding of a drum in a printer or copier. A star-shaped spring intercepting the differing longitudinal expansions of photoconductor drum and a shaft is arranged between an outer ring bearing the drum and an inner ring.

19 Claims, 7 Drawing Sheets

DEVICE AND METHOD FOR HOLDING A DRUM IN A PRINTER OR COPIER

FIELD OF THE INVENTION

The present invention relates to a device for holding a drum on one side, particularly in a printer or copier, with an inner ring established on a shaft concentric to the drum, and with an outer ring that carries an end-face of the drum on a shoulder. The present invention also relates to a method using the aforesaid device.

BACKGROUND OF THE INVENTION

An important instance of using the present invention concerns the holding of a drum that has a cladding layer, upon which a toner image can be produced for printing or copying. The cladding layer can be a photoconductive layer or a magneto-optically influenced layer. Such a drum must be free of play and be securely fixed in a bearing device over the entire temperature range of the use.

When operating the drum, different expansions of shaft and drum can result by means of local temperature differences. For example, great expansion differences result when the shaft is expediently fabricated of steel and the drum out of aluminum. If the drum is in a cold state and is installed in a printer not yet warmed up, then different expansions of the drum and shaft can thereby occur in the warmup phase. For customary dimensions, the differences in expansion can be noticeably greater than 0.1 mm. The holding element, which bears the drum on one side, must then recede by this expansion difference since the forces produced as a result of the thermal expansion are very great. When the printer and consequently the drum cool off in turn, e.g. after shutdown, the drum generally shrinks more severely than the shaft—the result is a process the reverse of that during warmup. It can happen that the holding element that holds the drum on one side does not participate in the receding movement of the drum in the axial direction, e.g. because the device with the holding element migrated during the thermal expansion the shaft, and a potentially available restoring force is not adequate to exact the reverse movement, especially then when spread elements, that spread out upon screwing, are present for the exact centering of the drum flange on the drive shaft between the drive shaft and the drum flange. The result thereof is that the end-face of he device lies loosely - a tilted, out of round running of the drum can occur. Theoretically, it would be possible to allow a restoring force to act on the device that is so great that the device on the shaft also does the receding movement during the cool down. However, this restoring force must be extremely great which leads to a high technical expenditure. If a tight fit is used for the exact centering of the drum flange on the drive shaft instead of the spread elements, a tilting and thus a jamming of the device is probable.

A bearing means free of play is known from the EP-A-0 345 270 for a photoconductor drum in a printer or copier. The photoconductor drum disclosed therein is arranged fixed on one side of the drive shaft. The other free end of the drum is held by an hub flange that can be moved in an axial direction. A clamp mechanism presses resiliently against the drum. For the centering of the drum flange on the drive shaft, spread elements which spread during screwing are arranged between the drive shaft and the drum hub flange. In this fashion, a high precision of balanced running is to be achieved given easier replacement of the photoconductor drum.

A fastening means for a photoconductor drum of an electrographic printer or copier is known from DE-A43 15 274. The photoconductor drum is clamped between the two drum flanges, whereby one drum flange is held (detachably) on the shaft with the aid of an adjusting nut that can be screwed onto the shaft. A compression spring is active between the drum flange and the adjusting nut, which presses one of the drum flanges against the drum. The adjusting nut and the associated drum flange are joined together in a detachable fashion with the aid of a clamp part.

The two above recited publications are based on the developments of the same applicant. The content of the two publications is hereby incorporated by reference in the present patent application.

A device for holding a drum on one side in a printer or copier is known from the JP 03-181 983 A with abstract, whereby the drum in the holding state is supported by the shoulder of an outer ring. This outer ring is arranged (such that it can be shifted axially) on an inner ring that is arranged on a shaft running concentric to the drum axis. This inner ring is moveable in an axial direction and supported against a spring. In this fashion, the outer ring in rigid connection with the inner ring is elastically pressed against the rim of the photoconductor drum in the holding state of the photoconductor drum.

The JP 62-67580 with abstract discloses a holding device for holding a photoconductor drum. A conical bevel of the photoconductor drum is held by a conical counterpart of a ring bearing. The ring bearing is freely moveable on a shaft in an axial direction and is pressed against the photoconductor drum by means of a spring.

The publications JP 01-254971 with abstract and JP 05-289588 A with abstract also concern holdings for photoconductor drums. The respective elements for holding an end section of the photoconductor drum are arranged on the concentric shaft and movable in an axial direction.

SUMMARY OF THE INVENTION

An object of the present invention is to indicate a device and a method for holding a drum on one side, said device, or respectively, said method enabling the drum to be securely clamped free from play over the entire operational temperature range.

In an embodiment, the present invention provides a device for holding a drum for a printer or a copier on one end of the drum. The device comprises an inner ring connected to a shaft that is concentric to the drum The device further comprises an outer ring that comprises a shoulder. The shoulder of the outer ring engages the end of the drum. The outer ring is connected to the inner ring by an elastic element. The outer ring is axially shiftable relative to the inner ring thereby enabling the shoulder of the outer ring to press against the end of the drum in a holding state.

In an embodiment, the elastic element comprises a disk-shaped spring.

In an embodiment, the disk-shaped spring comprises a star-shaped spring having spring lamellas arranged in a Meander form.

In an embodiment, the shoulder of the outer ring has a convex surface and the end of the drum is tensed concentrically to the shaft in the holding state.

In an embodiment, the device further comprises a shifting element that frictionally connects the inner ring to the shaft in a first shifted state. The shifting element also flexibly releases the inner ring from the shaft in a second shifted state.

In an embodiment, the shifting element is a rotary knob that is threadably connected to the shaft.

In an embodiment, the device further comprises a detent motion device that engages the rotary knob and which restrains axial movement of the rotary knob.

In an embodiment, the star-shaped spring is tensed using a prescribed spring force in a detent state and play is present between the flange and the outer ring or, in other words, the flange is spaced-apart from the outer ring.

In an embodiment, the shaft and the drum have different thermal expansion coefficients.

In an embodiment, the shaft comprises steel and the drum comprises aluminum.

In an embodiment, a spring path in the holding state is a multiple of the expansion coefficient difference of the shaft and the drum that arises during operation of the drum.

In an embodiment, the inner ring comprises a first sleeve connected to the shaft and a second sleeve that can be shifted axially. The first and second sleeves are disposed between the shaft and a bearing bush which is disposed between the first and second sleeves and the inner ring.

In an embodiment, the device further comprises a radial tension element disposed between the first sleeve and the second sleeve. The radial tension element radially aligns the bearing bush concentric to the shaft in an extended state.

In an embodiment, the radial tension element is a star-shaped spring that radially elongates against the first sleeve given pressure of the second sleeve and which concentrically aligns the bearing bush on the first and second sleeves.

In an embodiment, the second sleeve comprises a detent motion device against which the shifting element stops in the holding state and which biases the second sleeve against the first sleeve under compression of the radial tension element.

In an embodiment, the spring elements of the star-shaped spring are connected to the inner ring and the outer ring with screws.

In an embodiment, the star-shaped spring is connected to the inner ring, the outer ring and the flange with screws.

In an embodiment, the outer ring is releasably connected to the flange.

In an embodiment, the present invention provides a method for holding a drum on one end of the drum that comprises the steps of providing an inner ring connected to a shaft that is concentric to the drum and an outer ring that comprises a shoulder that engages the drum and whereby the outer ring is connected to the inner ring by an elastic element and further whereby the outer ring is axially shiftable relative to the inner ring thereby enabling the shoulder of the outer ring to press against the end of the drum in a holding state, shifting the outer ring axially relative to the inner ring during operation of the drum and the shaft and pressing the outer ring in a holding state against the end of the drum by means of the elastic element.

In conformity with the invention, the device contains an inner ring established on the shaft as well as an outer ring that bears an end-face of the drum on a shoulder. The outer ring is axially adjustable relative to the inner ring. In the state in which the drum is held by the device, an elastic element presses the outer ring against the end-face of the drum, whereby the elastic element is supported on the inner ring. Whenever different expansions of the drum and shaft occur as a result of temperature changes, these expansions are thereby intercepted by the elastic element, whereby an axial shift occurs between the outer and inner ring. Thus, the forces acting during the thermal expansion are safely intercepted by the elastic element. Whenever a cool down of the drum and the shaft takes place after an expansion, the elastic element acts such that the outer ring follows the longitudinal shrinkage of the drum, whereby the clamping force onto the end-face of the drum is maintained. A loosening of the clamping of the drum at the outer ring is avoided. As a result thereof, the drum remains, in all temperature conditions, in a defined, concentric position to the shaft - an out of round or tilted running of the drum is avoided.

A method for holding a drum on one side is indicated according to further aspect of the invention. The advantageous effects already described in connection with the device are achieved with the aid of this method.

Other objects and advantages of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiment illustrated in greater detail in the accompanying drawings and described below by way of an example of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
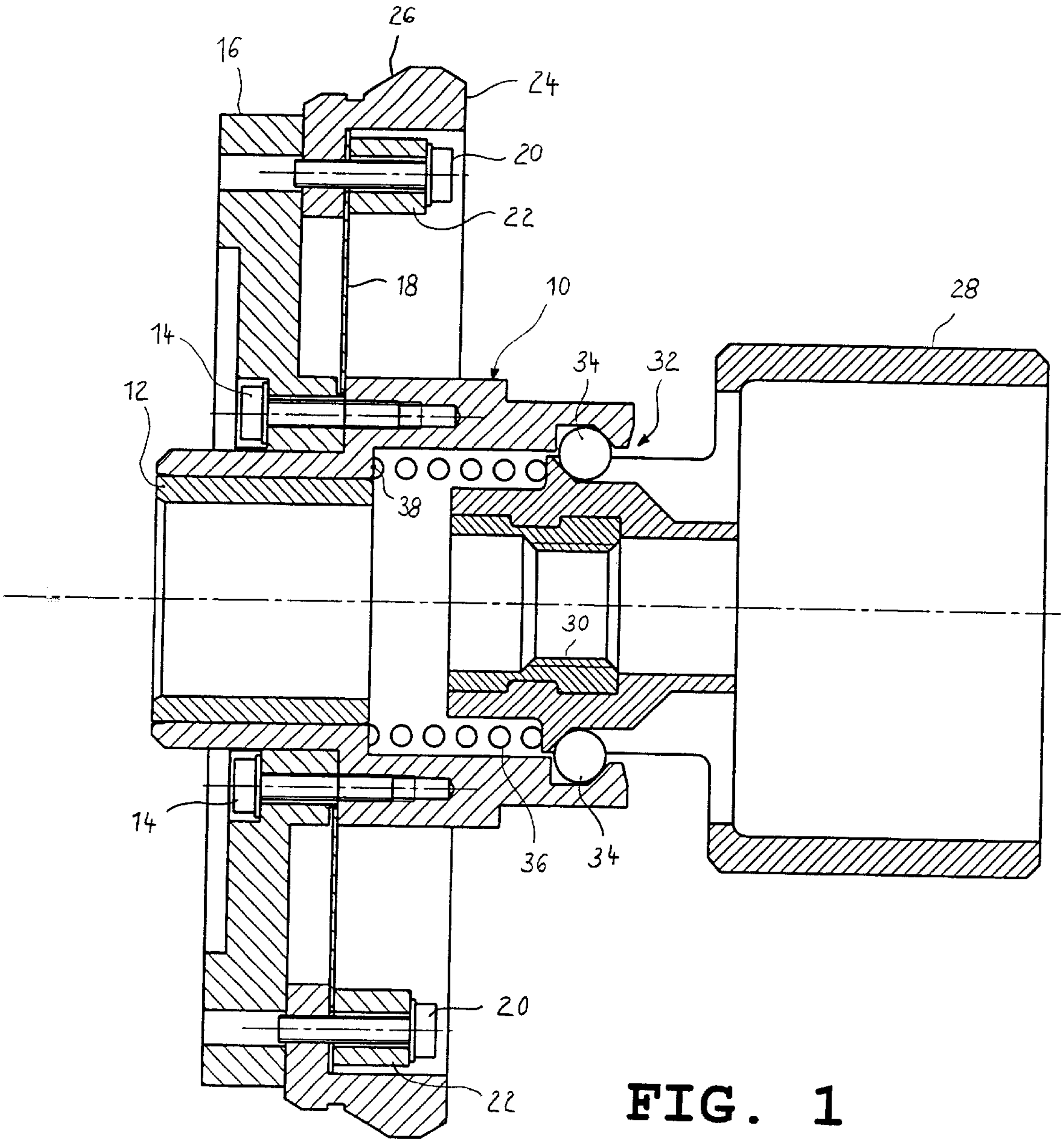
FIG. 1 is a side sectional view of a device made in accordance with the present invention for holding a drum on one side in a mounted state without shaft and drum.

FIG. 1 shows the device for holding a photoconductor drum in the mounted state in a cross-sectional representation. Such a photoconductor drum is installed in a printer or copier. An inner ring 10 comprises a bearing bush 12. The inner ring 10 is connected to a flange 16 with the aid of a screw 14. With the aid of this flange 16, an outer, star-shaped spring 18, the structure of which is described more exactly further below, is attached at an outer ring 24 using screws 20 and clamp pieces 22 and holds this outer ring 24. The spring 18 serves as an elastic element. The outer ring 24 has a shoulder 26 with a conical surface.

A rotary knob 28 has an inside thread 30 and is supported by means of a ball bearing 32 with balls 34 at the inner ring 10. A compression spring 36 presses against an inner shoulder 38 fashioned at the inner ring.

Figure 2:
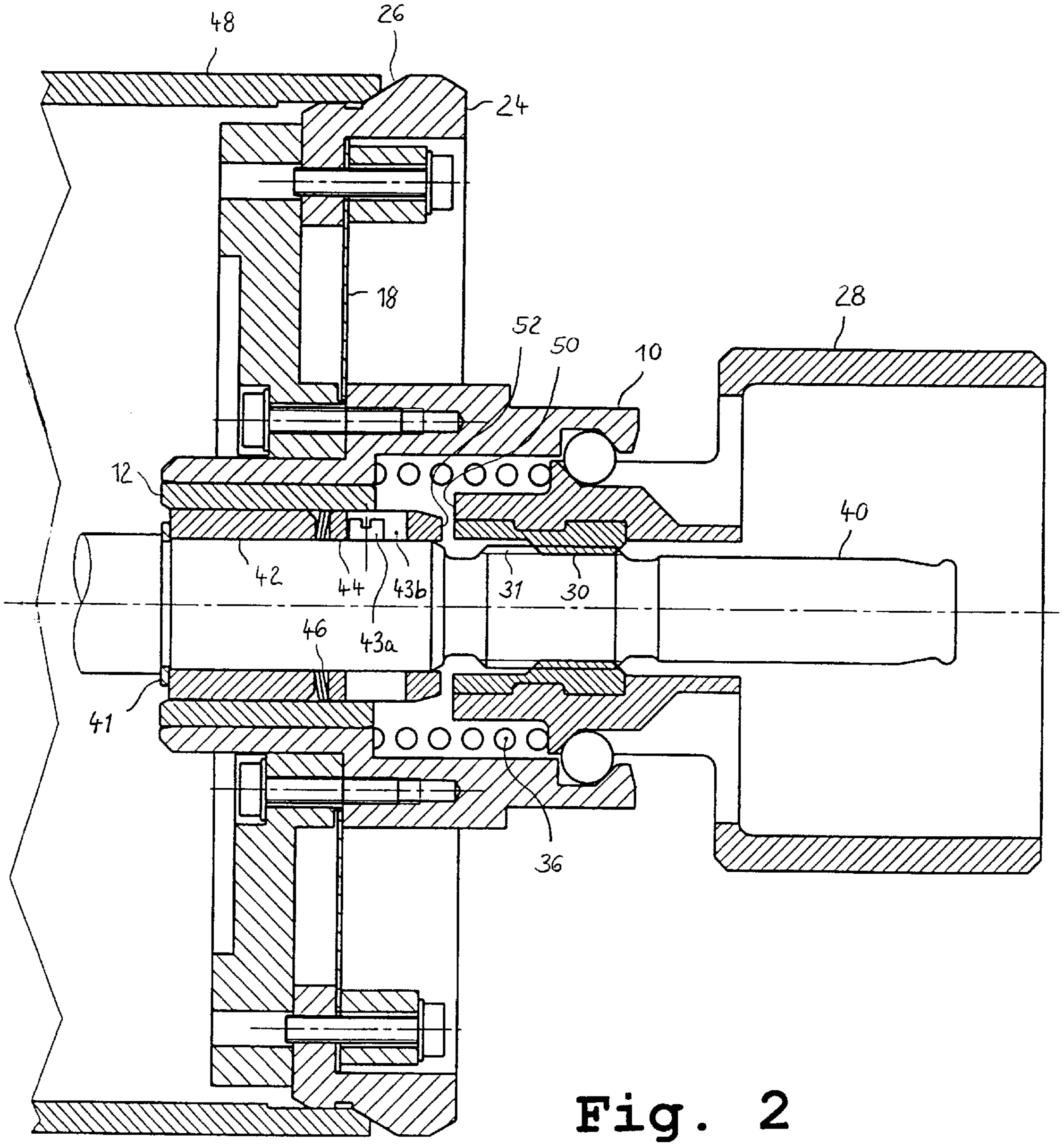
FIG. 2 is a side sectional view of the device shown in FIG. 1 attached onto the shaft.

FIG. 2 shows the device fastened to a shaft 40. Serving as the fastening are a first sleeve 42 and a second sleeve 44, between which an inner star spring 46 is arranged as the radial tension element. The first sleeve is frictionally engaged to the shaft 40; or is supported by the end-face at a shaft retention 41 or at a shoulder of the shaft; the second sleeve 44 is adjustable in an axial direction. A screw 43*a* in a slotted hole 43*b* sets the position of the sleeve 44. Whenever the second sleeve 44 is moved in the direction of the first sleeve 42, the star spring 46 is thus deflected in a radial direction and wedges the bearing bush 12 so that this is very inflexibly connected to the shaft 40 and can be shifted in an axial direction only given the expenditure of very high forces. The star spring 46 orients the bearing bush 12 and thus the inner ring 10 and indirectly in turn the outer ring 24 concentrically to the shaft 40. This outer ring 24 bears the end-face of a photoconductor drum 48 on the shoulder 26. This photoconductor drum 48 is connected to its other end-face by a flange element, which is in turn connected to the shaft 40. The structure of such a flange element is disclosed by way of example in the initially recited publications EP-A-0 345 270 and DE-A43 15 274. The shaft 40 is driven, whereby the photoconductor drum 48 is also turned. The photoconductor drum 48 has a photosensitive layer at its outer side, the illumination of which can produce an electrostatically latent image. This latent image is colored in with toner. The toner image is then transferred onto a carrier material in a printer or in a copier.

Given the prior Art, the outer ring 24 and the inner ring 10 are generally fashioned as an individual, rigid unit. The problems arising thereby are to be briefly discussed on the basis of the FIG. 2. The shaft 40 is generally composed of steel for design and static reasons. The photoconductor drum 48 is essentially composed of aluminum. The two materials have a strongly differing expansion coefficient. During operation of the photoconductor drum 48, this as well as the shaft 40 warm up. Since aluminum has a greater expansion coefficient, the outer ring 24 would be displaced in the direction to the right in FIG. 2 given a rigid coupling with the inner ring 10 in spite of the wedging by means of the star spring 46, i.e. the bearing bush 12 is moved to the right relative to the shaft 40 despite high friction forces at the star spring 46. During cool down the photoconductor drum 48 shrinks in a axial direction. In spite of the spring force of the compression spring 36, the bearing bush 12 and thereby the inner ring 10 and the rigidly coupled outer ring 24 would not be reliably moved to the left in FIG. 2 since the star spring 46 prevents an axial excursion. The result therefrom would be that the photoconductor drum 48 detaches at its right end-face from the shoulder 26 and only lies loosely thereon. Accordingly, the photoconductor drum 80 would run out of round or tilted to the center axis which would lead to a deterioration of the printed image. In addition, the photoconductor drum 48 could slip, i.e. that the photoconductor drum 48 would not or not completely follow the turning movement of the drive shaft, which would lead to an undesired printed image distortion and/or a shifting of the printed image. As will be explained in more detail below, the negative effect described is avoided by the division into one inner ring 10 and one outer ring 24 that are connected via the star-shaped spring 18.

It should still be pointed out that the state is shown in FIG. 2, whereby the rotary knob 28 is shifted far enough to the left via its inside thread 30 that is engaged by an outside thread 31 on the shaft 40 such that the end-face of the photoconductor drum 48 comes into contact with the shoulder 26. In the state shown in FIG. 2, there is still play provided between the end-face 50 of the rotary knob 28 and the end-face of the second sleeve 44, this end-face provides a detent motion device 52.

Figure 3:
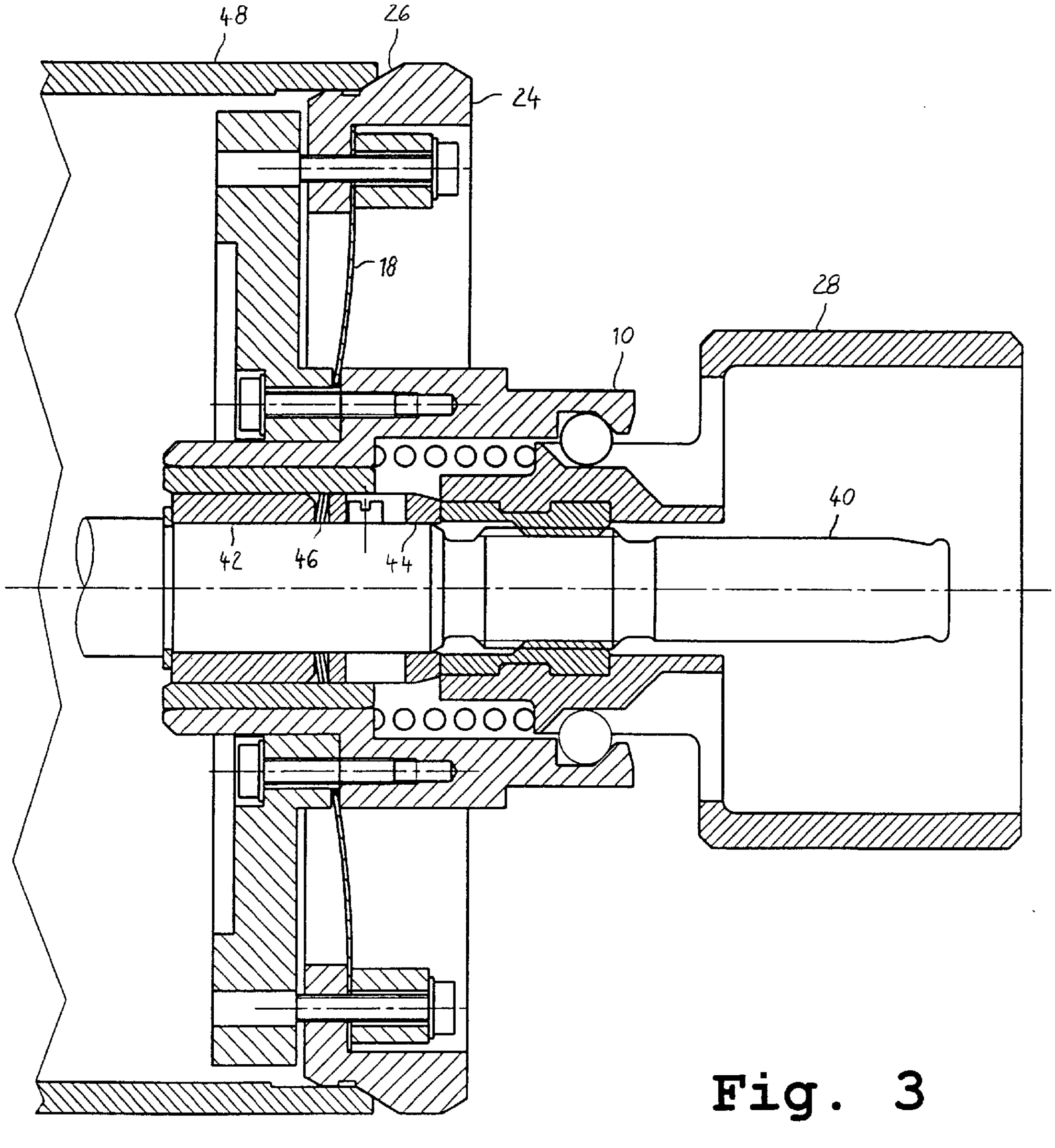
FIG. 3 is a side sectional view of the device shown in FIG. 1, whereby an outer, star-shaped spring is already tensed.

FIG. 3 shows a state, whereby the rotary knob 28 has been axially moved to the left far enough until the aforesaid play is eliminated; the outer ring 24 is extracted relatively to the right (against the force of the star-shaped spring 18) due to the detent action of the photoconductor drum 48. It is worth noting that the inner star spring 26 is not yet tensed as a radial tension element.

Figure 4:
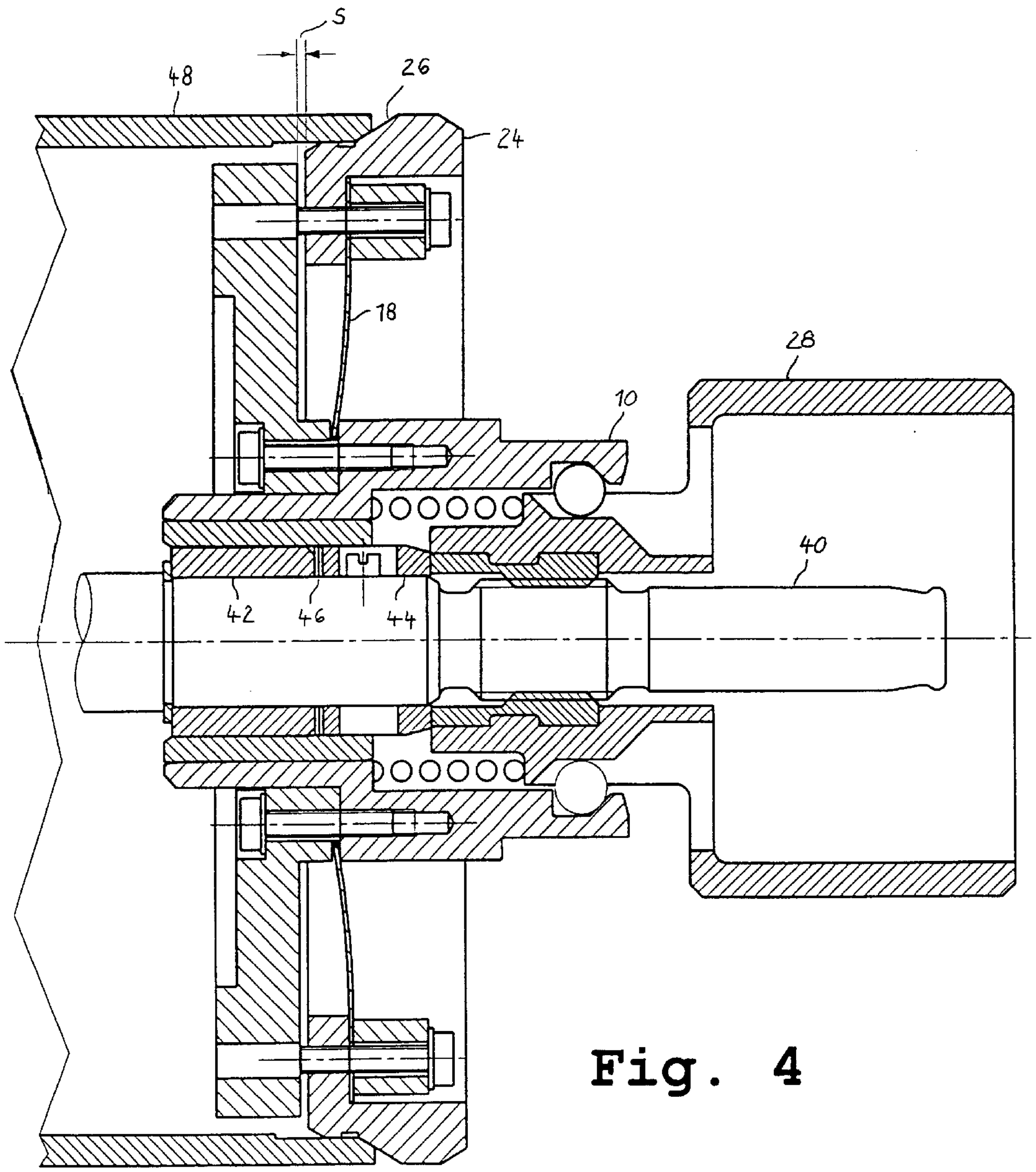
FIG. 4 is a side sectional view of the device shown in FIG. 1 with a completely tensed spring.

FIG. 4 shows the holding state of the device, whereby the second sleeve 44 is moved further to the left by means of the further turning of the rotary knob 28, whereby the star spring 46 is tensed and elongated in the radial direction, whereby the bearing bush 12 is friction connected to the shaft 40. A play "s" is present between the flange 16 and the outer ring 24. This play amounts to several 1/10 millimeter, i.e. a multiple of the expansion difference between shaft 40 and photoconductor drum 48 given operationally determined temperature changes. Whenever the photoconductor drum 48 and the shaft 40 warm up, expansion differences do indeed arise that are intercepted, however, by the spring path of the star-shaped spring 18. During cool down of the recited device, the spring 18 springs back, whereby the photoconductor drum always lies under stress on the conical shoulder 26. The tension force, whereby the photoconductor drum is held on the shoulder 26, does indeed change somewhat dependent on the temperature. This is not critical, however, as long as the photoconductor drum 48 still lies securely under pressure forces on the shoulder 26.

Figure 5:
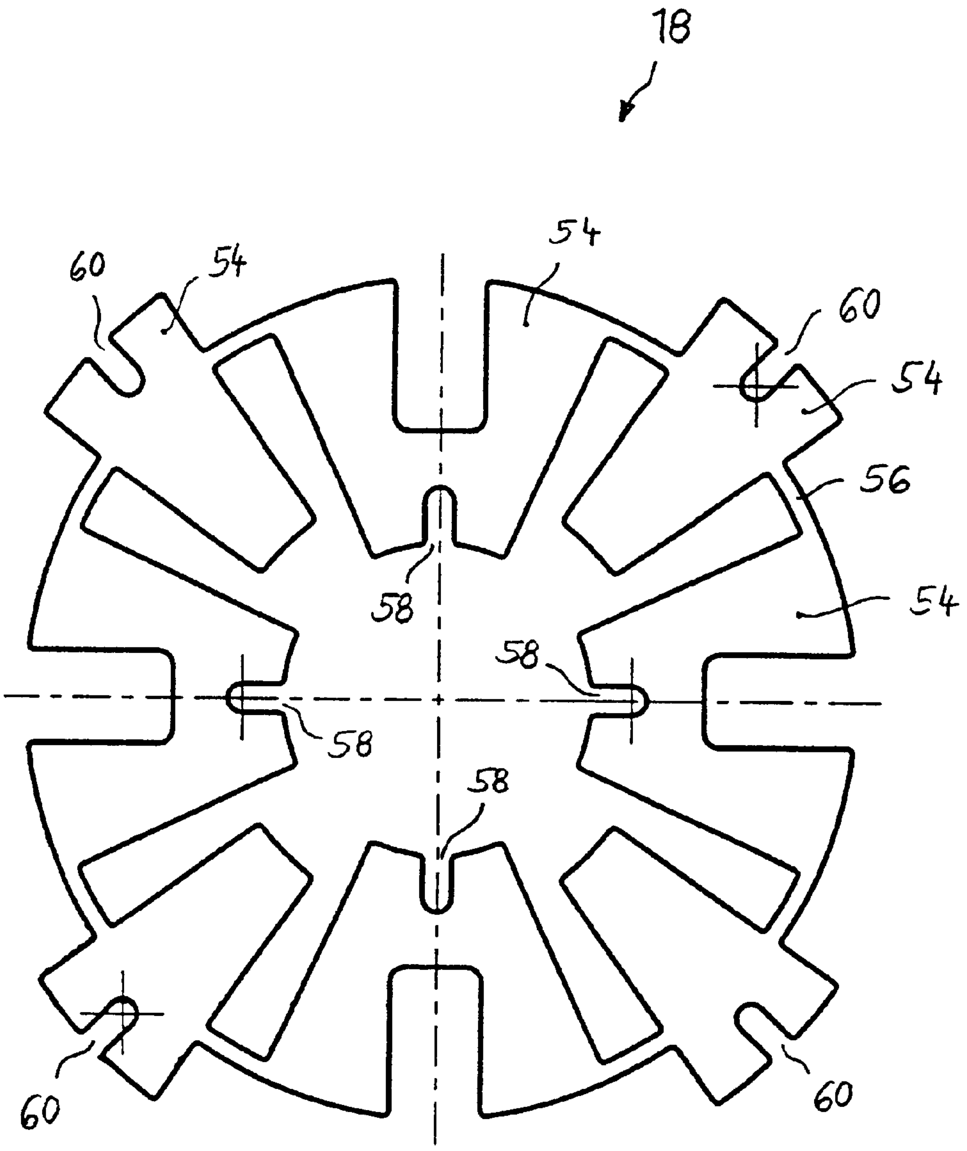
FIG. 5 is a plan view of the star-shaped spring of the present invention.

FIG. 5 shows a plan view of the star-shaped spring 18. It comprises lamellar spring elements 54 that are connected together by means of narrow webs 56. The spring 18 is fastened at the inner ring 10 at four places 58. A fastening also at four places 60 ensues at the outer ring 24. The inner fastening 58 and the outer fastening 60 respectively alternate. The outer end of the spring 18 lying opposite the inner fastening 58 only presses axially at the outer ring 24; i.e. the spring 18 is radially free in this regard. In the reverse fashion, the inner end (lying opposite an outer fastening 60) of spring 18 presses only axially at the inner ring 1 0; the spring 18 is also radially free in this regard. Lamellas having an outer fastening 60 and an inner fastening 58 are connected via the narrow webs 56. With limited radial force, these narrow webs 56 can appreciably compensate the diameter change that the spring experiences of necessity between its inside diameter and its outside diameter given its functionally required resilience, and thus can largely avoid a position change of the outer ring 24 in reference to the inner ring 10. These narrow webs 56 also have a positive effect given temperature changes because the star-shaped spring 18 preferentially fabricated of steel expands less vigorously than the inner ring 10 preferentially fabricated of aluminum and the outer ring 24, with which the spring 18 is connected.

Figure 6:
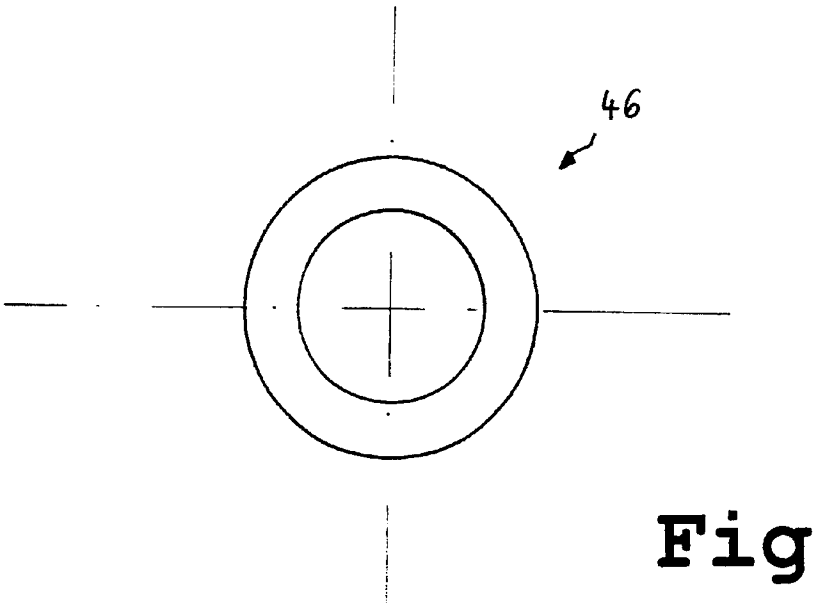
FIG. 6 is a front view of a radial clamp element of the present invention.

FIG. 6 shows a top view on the star spring 46 that serves as a radial tension element. The star spring 46 is ring-shaped. It can have a Meander form with spring lamellas according to the species of the star-shaped spring 18 shown in FIG. 5.

Figure 7:
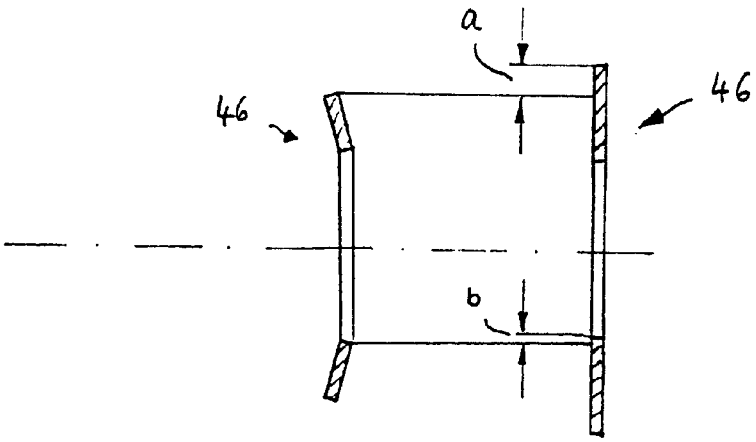
FIG. 7 is a side sectional view through the radial clamp element of FIG. 6 in the unloaded and in the loaded state.

FIG. 7 shows a cross-section through the star spring 46 in the left image portion. It can be seen that the ring is convexly curved. It can be seen in the image part at the right that given a compression between the two sleeves 42, 44, the ring is pressed in a plane whereby it radially enlarges. In FIG. 7, this enlargement of the outside diameter is identified by "a" and the decrease of the inside diameter by "b". For purposes of a better overview, these relationships are shown greatly exaggerated in FIG. 7. A concentric clamping of the bearing bush 12 to the shaft 40 is achieved by means of this radial enlargement of the star spring 46.

Figure 8:
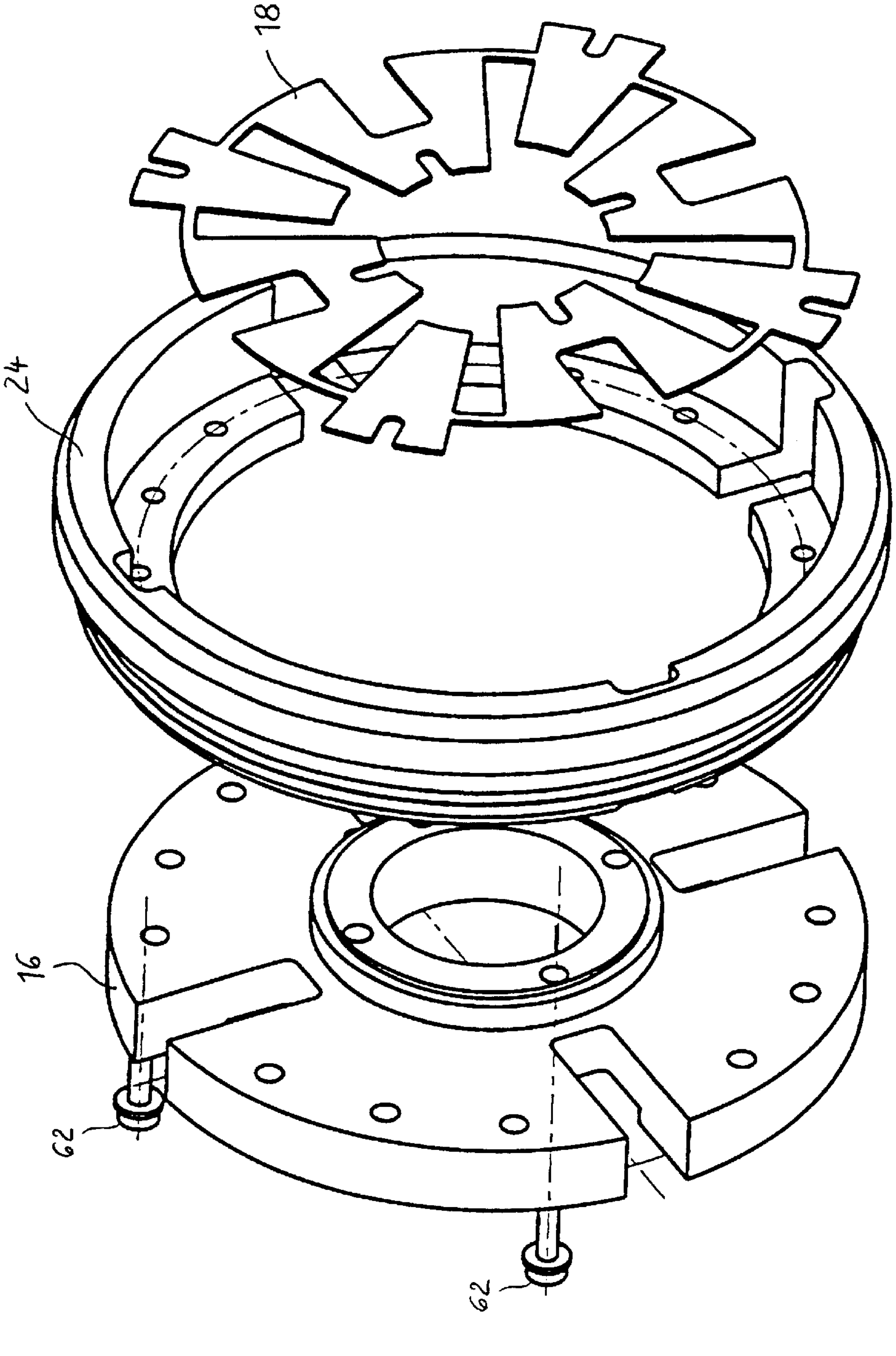
FIG. 8 is an exploded perspective view of the essential parts of the device shown in FIG. 1.

FIG. 8 shows an exploded view representation of the interaction of the elements flange 16, outer ring 24, and star-shaped spring 18. The flange 16 has an outside diameter that almost coincides with the diameter of the outer ring 24. As mentioned, the star-shaped spring 18 is fastened at its inside diameter by means of the flange 16 at the inner ring 10 (compare hereto e.g. FIG. 1). The outer ring 24 can also be connected rigidly with the flange 16 with the aid of screws 62. The outer ring 24 is then rigidly connected with the inner ring 10 and thus with the shaft 40. In this state, the outer ring 24 is subjected to a precision manipulation, whereby the shoulder 26 is repositioned by manipulation with respect to concentricity. Subsequently, the rigid connection between flange 16 and outer ring 24 is released again and the outer ring 24 is held in its concentric position to the shaft 40 merely by means of the star-shaped spring 18. As a result of this manipulation, the shoulder 26 passes concentrically to the shaft 40 by means of the star-shaped spring 18 at the inner ring 10 despite the flexible fastening.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claim is:

1. A device for holding a drum for a printer or a copier on one end of the drum, the device comprising:

an inner ring connected to a shaft, the shaft being concentric to the drum;

an outer ring comprising a shoulder, the shoulder of the outer ring engaging the end of the drum;

the outer ring being connected to the inner ring by an elastic element;

the outer ring being axially shiftable relative to the inner ring thereby enabling the shoulder of the outer ring to press against the end of the drum in a holding state.

2. The device of claim 1 wherein the shaft and the drum have different coefficients of thermal expansion.

3. The device of claim 2 wherein the shaft is comprised of steel and the drum is comprised of aluminum.

4. The device of claim 2 wherein a spring path in the holding state is defined by a multiple of the difference in the coefficients of thermal expansion of the shaft and the drum.

5. The device of claim 1 wherein the elastic element comprises a disk-shaped spring.

6. The device of claim 1 wherein the shoulder of the outer ring has a convex surface and wherein the end of the drum is tensed concentrically to the shaft in a holding state.

7. The device of claim 5 wherein the disk-shaped spring comprises a star-shaped spring having spring lamellas arranged in a Meander form.

8. The device of claim 7 wherein the spring elements of the star-shaped spring are connected to the inner ring and the outer ring with screws.

9. The device of claim 7 further comprising a shifting element that frictionally connects the inner ring to the shaft in a first shifted state, the shifting element flexibly releasing the inner ring from the shaft in a second shifted state.

10. The device of claim 9 wherein the shifting element is a rotary knob that is threadably connected to the shaft.

11. The device of claim 10 further comprising a detent motion device that engages the rotary knob and which restrains axial movement of the rotary knob.

12. The device of claim 11 further comprising a flange disposed inside the drum and wherein the star-shaped spring is tensed using a prescribed spring force in a detent state and wherein the flange is spaced apart from the outer ring.

13. The device of claim 12 wherein the star-shaped spring is connected to the inner ring, the outer ring and the flange with screws.

14. The device of claim 13 wherein the outer ring is releasably connected to the flange.

15. The device of claim 9 wherein the inner ring comprises a first sleeve connected to the shaft and a second sleeve that can be shifted axially along the shaft, the first and second sleeves are disposed between the shaft and a bearing bush which is disposed between the first and second sleeves and the inner ring.

16. The device of claim 15 wherein the second sleeve comprises a detent motion device against which the shifting element stops in the holding state and which biases the second sleeve against the first sleeve under compression of the radial tension element.

17. The device of claim 15 further comprising a radial tension element disposed between the first sleeve and the second sleeve, the radial tension element radially aligning the bearing bush concentrically to the shaft.

18. The device of claim 17 wherein the radial tension element is a star-shaped spring that biases the first spring in response to a biasing pressure by the second sleeve and which concentrically aligns the bearing bush on the first and second sleeves.

19. A method for holding a drum for a printer or a copier on one end thereof, the method comprising the following steps:

providing an inner ring connected to a shaft that is concentric to the drum;

an outer ring comprising a shoulder, the shoulder of the outer ring engaging the end of the drum;

the outer ring being connected to the inner ring by an elastic element;

the outer ring being axially shiftable relative to the inner ring thereby enabling the shoulder of the outer ring to press against the end of the drum in a holding state;

shifting the outer ring axially relative to the inner ring during operation of the drum and the shaft; and pressing the outer ring against the end of the drum in the holding state by means of the elastic element.

* * * * *

UNITED STATES PATENT AND TRADEMARK OFFICE

CERTIFICATE OF CORRECTION

PATENT NO. : 6,382,837 B1
DATED : May 7, 2002
INVENTOR(S) : Otto Olbrich and Peter Thiemann It is certified that error appears in the above-identified patent and that said Letters Patent is hereby corrected as shown below:

Title page,
Please insert the following:
-- [60] Claims priority benefits of German patent application 199 22 986.4, filed May 19, 1999 --

Signed and Sealed this

Eighth Day of October, 2002

Attest:

JAMES E. ROGAN

*Attesting Officer* *Director of the United States Patent and Trademark Office*